United States Patent Office 3,431,629
Patented Mar. 11, 1969

3,431,629
JOINING ALUMINUM
Philip T. Stroup, New Kensington, and James R. Terrill, Natrona Heights, Pa., assignors to Aluminum Company of America, Pittsburgh, Pa., a corporation of Pennsylvania
No Drawing. Filed June 24, 1966, Ser. No. 560,053
U.S. Cl. 29—471.1       5 Claims
Int. Cl. B23k 31/02

ABSTRACT OF THE DISCLOSURE

A method of joining by brazing aluminum members by first applying thereto a small amount of flux immersion depositable from an aqueous bath containing about 1½% to about 15% flux and by brazing in an atmosphere having a dew point of 40° F. or lower. The brazed joints exhibit very little detectable flux residue.

---

This invention relates to joining aluminum members by brazing, particularly by furnace brazing. By aluminum members is meant useful shapes, parts or components made of aluminum or its alloys.

As is generally recognized, aluminum members being brazed, often referred to as the parent metal, are joined by an aluminum brazing filler metal, usually an aluminum-silicon alloy, having a melting point slightly below that of the parent metal. Brazing is effected by heating the aluminum members to be joined, and the filler metal, to a temperature above the melting point of the latter but short of melting point of the former. The molten filler metal flows and forms a joining fillet between the parent metal members. Some diffusion between parent metal and filler metal occurs and the joint is considered, at least to some degree, to be metallurgically bonded.

Normally an alkali metal halide salt flux is employed to overcome the oxide coating on the parent metal and allow the filler metal to wet and flow over the parent metal surfaces. This is considered necessary to obtain the capillary flow and uninterrupted fillet formation desired. In furnace brazing, the flux is applied as an aqueous flux suspension to the assembled parts which are dried prior to heating to brazing temperature. Typical flux suspensions contain 50% or more of the flux, and they deposit substantial and easily visible amounts of flux on the parts. Post-brazing removal of flux residues resulting from such practices is desirable but often difficult, especially in the case of intricate or complex assemblies which tend to retain undesired, corrosive flux residues.

Vacuum or inert atmosphere brazing without any metal salt flux has been proposed as one way of alleviating flux residue problems. However, these processes are marked by practical disadvantages which greatly hinder their commercial utilization.

It is an object of the invention to provide a process of brazing aluminum members by the use of a small quantity of aluminum brazing salt flux which substantially eliminates flux residue problems. In particular, it is an object to provide a process which reduces the flux residue to a level which does not corrode aluminum or at least permits of readily removing undesired flux residues from the brazed assembly.

We have found that brazed joints of sound quality can be achieved by the use of flux in amounts heretofore thought to be quite insufficient, provided brazing is effected in an atmosphere in which the moisture content is properly controlled. According to the present invention, the use of various atmospheres, including air, having a dew point of 40° F., or lower and the use of a flux in the amounts immersion depositable from an aqueous solution containing not over 15% flux, facilitates sound brazed joints. Brazing is accomplished by bringing the aluminum parent members and filler metal, in joining relationship, to brazing temperature under these conditions. The extremely small amount of flux employed leaves only a slight residue which, after brazing, can be readily removed even from very intricate assemblies by ordinary water rinsing, if desired. We have found it convenient and desirable to use flux in the amounts immersion depositable from aqueous solutions containing at least ½% flux, preferably 1½ to 7% flux, an to preferably braze in an atmosphere having a dew point of from minus 10° to minus 100° F., with the result that the post-brazing flux residue is so small that the brazed product is suitable for most applications without the need for cleaning. An embodiment of our invention particularly useful in brazing intricate assemblies employs flux in an amount immersion depositable from a bath containing 5% thereof and brazing in air having a dew point of minus 40° F. Brazed joints so produced are sound and require no cleaning. This is in distinct contrast to the prior art practice wherein furnace brazing was effected in ordinary, much more humid atmospheres, e.g. those characterized by dew point levels of 100 to 150° F., or more, and wherein flux is employed in much greater amounts as by applying to the assembly a slurry containing 50% or more flux which produces a heavy flux deposit, a resulting heavier flux residue and the attendant flux removal problem.

An advantage of the process of the invention is the ease with which the needed amount of flux can be applied to an intricate assembly requiring brazing at a plurality of joining sites. As already indicated and explained in more detail hereinafter, assemblies can be coated with the small amount of flux required in the practice of the invention by immersion in a very dilute flux bath which is inherently fluid and tends to reach all surface portions exposed to it, even in a highly intricate assembly. It provides a thin flux coating of generally uniform thickness and distribution that is practically unnoticeable to the eye. The capability of using so little flux is a very significant improvement over the prior practice where the assembly is more heavily coated, the flux tending to become trapped in crevices resulting in a tenacious and non-uniform flux coating. Cleaning such an assembly after brazing is extremely difficult, since the crevices where the flux is trapped represent the portions of the assembly most difficult to clean. The crevices inherently provide the sites most prone to the corrosion problems associated with the flux residue.

The flux employed in the improved process is an aluminum brazing salt flux capable of satisfactorily disrupting the oxide coating normally found on aluminum members. The aluminum brazing salt fluxes now known to serve best the purposes of this invention are those definable as alkali metal halide salt fluxes. Such fluxes generally comprise mixtures of the halides, mainly the chlorides and fluorides, of alkali metals, although it is common to include small amounts of one or more other salts such as the halides of aluminum, zinc, the alkaline earth and some heavy metals. These fluxes are generally chosen to melt within a temperature range of 900° to 1000° F., that is, just below the brazing temperature range. Various suitable compositions are known to those skilled in the brazing art and examples thereof may be found in the disclosures of U.S. Patents 2,299,164, 2,299,166, 2,357,125 and 2,507,346. Desirably the fluxes employed contain, by weight, 15 to 40% sodium chloride, 20 to 70% potassium chloride, up to 40% lithium chloride, up to 20% heavy metal chlorides and 5 to 25% fluoride salts, mainly of aluminum and alkali metals or complex fluoride salt derivatives thereof. Preferably the flux composition includes 1 to 10% lithium in the form of chloride or fluoride salt thereof. One such flux suitable in practicing the invention contains, by weight, 24% sodium chloride, 34% potassium chloride, 19% lithium chloride, 6% strontium chloride, 1% potassium fluoride and 16% cryolite, hereinafter referred to as composition A.

The amount of flux employed, as indicated earlier, is miniscule when compared to that previously associated with aluminum furnace brazing. The quantity of flux provided on the surface of the parent members may conveniently be described in terms of its deposition from an aqueous flux bath. According to our invention, flux must be provided at the brazing site and in an amount immersion depositable from an aqueous bath containing not more than 15% flux. The flux concentration percentages referred to are by weight. By the amount immersion depositable is meant that amount which would be deposited by a simple immersion in a thoroughly mixed aqueous bath of the selected flux concentration, followed by draining excess or non-adherent bath from the surface. In a given instance, the amount of flux deposited may be determined in terms of flux weight per unit area. For example, an aluminum specimen of known weight was immersed in an aqueous bath containing 15% of flux composition A, described earlier. The coated specimen was then dried and reweighed, and the amount of flux deposited thereon determined to be 0.05 ounces per square foot. This represents a distinct departure of one order of magnitude from prior furnace brazing practices where a minimum flux deposit of 0.4 ounces per square foot is considered essential for brazing with 0.5 ounces per square foot ordinarily being considered desirable for satisfactory brazing.

Obviously flux need only be provided at the joint or brazing site itself, that is, to substantial portions of at least one of the parent members to be wetted by the filler metal. Also, it is not indispensible that the joint site be coated with flux throughout, since the filler alloy will penetrate the oxide film at the flux sites and undermine adjacent oxide film. The manner of flux application can be varied, although immersion is preferred from the standpoint of convenience and consistent uniformity of deposition. Other means include brushing, spraying, roller application, and the like, so long as the amount applied at the joining site is that immersion depositable as set forth herein.

As stated at the outset of this description, the practice of the invention requires carefully controlling the moisture content of the atmosphere which prevails at the brazing site. This, we have found, permits the use of a variety of gases, or gas mixtures, some of which are not normally considered conducive to forming sound brazed joints. For instance air, nitrogen and even substantially pure oxygen can be employed as the brazing atmosphere when the moisture content thereof is controlled as herein described. Likewise the inert atmospheres such as argon are highly suitable in practicing the invention, although it should be obvious that the operability of our process with air is an advantage of great economic significance.

The extent to which the moisture content of the atmosphere is to be controlled is conveniently expressed in terms of dew point at atmospheric pressure. Moisture as used in this description refers to water, and dew point refers to that temperature at which the atmosphere is saturated with water. In practicing the invention, the dew point of the air or other brazing atmosphere prevailing at the brazing site when brazing temperature is reached must be 40° F. or lower, and preferably from minus 10° to minus 100° F.

Reducing the moisture content of the gas to the limits herein described is conveniently accomplished in a number of ways. For instance, refrigeration type dehumidifiers which reduce the moisture content of air or other gases to a minus 40° F. dew point are commercially available. Lower dew points are readily achieved by the use of such measures as passing the gas through a bed of activated alumina particles. Other means of providing atmosphere having dew points in the described ranges readily present themselves to those skilled in the art, the particular means employed not being of critical significance in practicing the invention. The pressure of the brazing atmosphere can vary somewhat in the practice of the invention. For instance, air having a dew point of minus 40° F. may be used as a brazing atmosphere at a fraction of atmospheric pressure or at pressures exceeding atmospheric without significant effect on the results. Generally it is advantageous to braze at a pressure just slightly higher than the ambient atmospheric pressure, since such can be achieved with a minimum of modification to readily available furnace equipment and tends to minimize contamination of the controlled atmosphere by in-flow of surrounding moisture-bearing air. Also a slight continuous purge of controlled atmosphere at the brazing site is preferable as a further facet of practice to assure its presence there. The purge rate is largely a matter of choice.

The aluminum parent members may be composed of aluminum or any aluminum alloy adapted to brazing. The aluminum brazing filler metal can be defined as an aluminum base alloy which melts at a lower temperature than any of the parent members being joined. There are currently available various such filler alloys which for the most part are comprised of about 75% or more aluminum and about 4 to 13% silicon. In some cases, substantial amounts of copper or zinc may also be included. As is known, brazing filler alloys are available in various forms, the most popular including wire, flattened wire, shims, wire rings, and brazing sheet. Examples of suitable brazing sheet products comprising an aluminum alloy core and an integral layer of aluminum brazing alloy are provided by the disclosure of U.S. Patent 2,312,039. By way of illustration, brazing sheets commercially available include aluminum filler metal cladding containing 7.5 or 10% silicon, and a core layer of aluminum alloy 3003 (Al, 1.2% Mn) or alloy 6951 (Al, 0.25% Cu, 0.35% Si, 0.65% Mg). The cladding normally constitutes 5 or 10% of the total thickness.

Brazing temperatures of our process are those normally associated with furnace brazing, namely, temperatures from about 975 to about 1175° F. Temperatures of about 1050 to 1150° F. are conveniently employed in practicing the invention. However, as is known, the term brazing temperature is considered to be any temperature which melts the filler metal but not the parent members, and the term as used herein is intended in that sense.

Illustrative of the practice of the invention, inverted T joints of the type commonly used in the aluminum brazing art to evaluate brazing procedures were made. The brazed structure comprised a horizontal or base member joined to the vertical member by a butt joint with a fillet on both sides of the junction. The horizontal member was Alcoa No. 11 brazing sheet having a core of aluminum alloy 3003 and a cladding of aluminum, 7.5% silicon alloy (the brazing filler metal) on its upper surface. The horizontal member was ¾ inch wide, 2 inches long and about 1/16 inch thick. The vertical member was of the same general size except that it was only ½ inch wide (the vertical dimension in the assembly). It consisted of aluminum alloy 3003 brazing alloy without any cladding. The members were assembled in joining relationship with the edge of the vertical member butting against the brazing filler metal cladding on the horizontal member, so as to provide a junction 2 inches long. The assembly was cleaned by immersion in methyl ethyl ketone. In many cases this initial cleaning is followed by an etching treatment to effect some degree of oxide coating removal, but such was not employed in this specific instance. The cleaned assembly was immersed in a bath consisting of distilled water and 2% of a flux containing 30% NaCl, 36% KCl, 18% LiCl, 8% ZnCl and 8% LiF. After a few seconds the specimen was removed and excess flux solution allowed to drain. The specimen was next dried in a 300° F. oven for 5 to 10 minutes, thus removing from the flux deposit water which otherwise might impair controlling the moisture content of the brazing atmosphere. The assembly was then placed in a small glass furnace provided with an external electrical resistance heating means. The furnace was not pre-evacuated but was purge with about 10 volume changes of the controlled brazing atmosphere to assure removal of excessive moisture. The controlled atmosphere in this case was ordinary air which had been dried to a dew point of minus 75° F. by passing through an activated alumina drying tower at room temperature. The controlled atmosphere was supplied at one end of the furnace to provide a flow past the assembly. The assembly was heated to a temperature of about 1130 to 1140° F. and held at that temperature and in the controlled atmosphere for about 2 minutes to allow brazing to occur, i.e. to allow the filler metal to flow and wet the parent members to form a substantially smooth and uninterrupted fillet connecting the members. The brazed assembly was removed from the furnace and cooled to room temperature, thus solidifying the filler metal to complete the brazing sequence. The brazed joints were characterized by large, uniform, smooth surfaced fillets indicative of structural soundness. Although not necessary, the assembly at this point may be washed to remove the small amount of flux residue. This can be accomplished by simple immersion in a water bath or by flushing with tap water.

In another example a portion of a larger finned tube heat exchanger, with alternating cooling fins and flow passages, was brazed according to the improved process. The finned portion was fashioned from corrugated 0.005 inch thick 3003 aluminum alloy foil. The flow passages were provided by mating similar pre-stamped pieces made from 0.015 inch thick Alcoa No. 12 brazing sheet comprising a core of 3003 aluminum alloy with aluminum 7.5% silicon alloy cladding on both sides. The assembly, measuring approximately 2 inches by 1½ inches by 8 inches, was secured together to assure proper joining relationship at the brazing sites. The assembly was cleaned in the fashion described in the foregoing example and then immersed in a distilled water solution containing 5% of flux composition A described earlier. The excess flux bath was allowed to drain off the assembly which was then dried in a 300° F. oven for 15 minutes and brazed in air having a dew point of minus 40° F., the other brazing conditions being the same as described in the foregoing example. This highly intricate assembly included well over 200 joints the cumulative length of which exceeded 300 inches. Most of the joints included a curved parent metal section. Each joint exhibited large, smooth, uninterrupted fillets indicative of structural soundness.

As is readily understood, the equipment used in the improved brazing method may be the same as that employed in conventional brazing with very little modification. It is, of course, desirable that the furnace be provided with a heating means which does not add moisture to the furnace atmosphere in contact with the assembly being brazed. Electrical resistance heating means are suitable. The furnace is preferably enclosed so as to minimize leakage and waste of the brazing atmosphere. Some means is needed to supply the furnace with the controlled atmosphere and, where a constant purge is used, to vent any excess gas. The furnace may vary from a small batch unit to a large continuous furnace through which is passed a continuous line of assemblies.

If desired, there can be grouped and performed on a continuous line any consecutive steps of the process. As an example, and not by way of limitation, a continuous brazing line may be provided with the following stations: (1) cleaning and assembling the members to be joined, (2) flux coating in an immersion bath, (3) drying, (4) brazing, and (5) residual flux removal or rinsing. The drying and brazing stations can be provided in a single housing or combination dryer-furnace, including drying and brazing stages. The drying stage would operate at a lower temperature than the brazing stage, and preferably would be provided with some means to carry off evolved moisture, so as to prevent its affecting the brazing zone. Such a combination unit would preferably be provided with a constant purge of the improved brazing atmosphere, particularly in the brazing zone, to assure proper brazing conditions.

What is claimed is:
1. A method of joining aluminum members by brazing comprising:
   (a) providing on the surface of at least one said aluminum member at the joining site an aluminum brazing alkali metal halide salt flux in an amount immersion depositable from an aqueous bath containing about 1½ to about 15% of said flux,
   (b) bringing said aluminum members to brazing temperature, in joining relationship, with an aluminum brazing filler metal disposed at said joining site, and with an atmosphere at said joining site having a dew point of 40° F. or lower,
   (c) maintaining the brazing temperature and said atmosphere at said joining site for a sufficient time to allow said filler metal to wet and form a joining fillet connecting said aluminum members at said joining site, and
   (d) solidifying said filler metal.

2. A method of joining aluminum members by brazing comprising:
   (a) providing on the surfaces of said aluminum members at the joining site an aluminum brazing alkali metal halide salt flux in an amount immersion depositable from an aqueous bath containing 1½ to 7% of said flux,
   (b) bringing said aluminum members, in joining relationship, with an aluminum brazing filler metal disposed at said joining site, to brazing temperature so as to melt said flux and said filler metal but not said aluminum members with an atmophere at said joining site having a dew point of from minus 10° to minus 100° F.
   (c) maintaining the brazing temperature and said atmosphere at said joining site for a sufficient time to allow said filler metal to wet and form a joining fillet connecting said aluminum members at said joining site, and
   (d) solidifying said filler metal.

3. A method of joining aluminum members by brazing comprising:
   (a) bringing said aluminum members into joining relationship at a plurality of joining sites in an assembly comprising said aluminum members together with aluminum brazing filler metal disposed at each said joining site,
   (b) immersing said assembly in an aqueous bath containing from 1½ to 7% of an aluminum brazing alkali metal halide salt flux,
   (c) removing said assembly from said bath and allowing non-adherent bath to drain therefrom, leaving said assembly with a moist flux coating,
   (d) drying said flux coating,
   (e) bringing said assembly to brazing temperature, with an atmosphere at said joining sites having a dew point ranging from minus 10° to minus 100° F.,
   (f) maintaining the brazing temperature and said atmosphere at said joining sites for a sufficient time to allow said filler metal to wet and form joining fillets connecting said aluminum members at each said joining site, and
   (g) solidifying said filler metal.

4. A method according to claim 1 wherein said filler metal is disposed as a surface cladding on at least one of said parent members.

5. A method according to claim 1 wherein said atmosphere is air.

References Cited

UNITED STATES PATENTS

| | | | |
|---|---|---|---|
| 2,714,760 | 8/1955 | Boam | 29—196 |
| 2,746,140 | 5/1956 | Belser | 29—471.1 |
| 2,907,105 | 10/1959 | Ohmi | 29—498 |
| 2,916,815 | 12/1959 | Donkervoort | 29—504 |
| 2,937,438 | 5/1960 | Lemon | 29—488 |
| 3,063,145 | 11/1962 | Bouton | 29—499 |
| 3,074,158 | 1/1963 | Finnegan | 29—495 |
| 3,081,534 | 3/1963 | Bredzs | 29—494 |
| 3,087,813 | 4/1963 | Veno | 75—175 |
| 3,133,348 | 5/1964 | Cape | 29—494 |
| 3,235,959 | 2/1966 | Bartoszak | 29—498 |
| 3,242,565 | 3/1966 | North | 29—487 |
| 3,321,828 | 5/1967 | Miller | 29—488 |
| 3,322,517 | 5/1967 | Miller | 29—197.5 |
| 3,356,494 | 12/1967 | Bredzs | 75—141 |
| 3,375,570 | 4/1968 | Debusker | 29—472.3 |

JOHN F. CAMPBELL, *Primary Examiner.*

R. F. DROPKIN, *Assistant Examiner.*

U.S. Cl. X.R.

29—494, 495, 502, 504, 197.5